US008156134B2

(12) United States Patent
Sun et al.

(10) Patent No.: US 8,156,134 B2
(45) Date of Patent: Apr. 10, 2012

(54) USING DIFFERENT GROUPS OF QUERY GRAPH TRANSFORM MODULES TO GENERATE EXECUTION PLANS FOR QUERIES FOR DIFFERENT DATABASE TYPES

(75) Inventors: Charlene Xiaoqin Sun, Palo Alto, CA (US); David J. Wisneski, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 11/941,003

(22) Filed: Nov. 15, 2007

(65) Prior Publication Data
US 2009/0132503 A1    May 21, 2009

(51) Int. Cl.
*G06F 17/30* (2006.01)
(52) U.S. Cl. ........ 707/763; 707/706; 707/760; 709/248; 709/249; 709/250
(58) Field of Classification Search .................. None
See application file for complete search history.

(56) References Cited

U.S. PATENT DOCUMENTS

| | | | | |
|---|---|---|---|---|
| 5,257,366 A | * | 10/1993 | Adair et al. ........................ 1/1 |
| 5,379,419 A | * | 1/1995 | Heffernan et al. ............... 707/4 |
| 5,524,253 A | * | 6/1996 | Pham et al. .................... 709/202 |
| 5,761,493 A | * | 6/1998 | Blakeley et al. .................... 1/1 |
| 5,826,077 A | * | 10/1998 | Blakeley et al. .................... 1/1 |
| 5,913,214 A | * | 6/1999 | Madnick et al. ............... 707/10 |
| 5,970,490 A | * | 10/1999 | Morgenstern ................... 707/10 |
| 6,081,799 A | | 6/2000 | Beavin et al. |
| 6,269,373 B1 | | 7/2001 | Apte et al. |
| 6,285,997 B1 | * | 9/2001 | Carey et al. ...................... 707/4 |
| 6,523,029 B1 | * | 2/2003 | Kulyukin ...................... 707/707 |
| 6,591,272 B1 | | 7/2003 | Williams |
| 6,882,995 B2 | * | 4/2005 | Nasr et al. ..................... 707/713 |
| 6,941,298 B2 | | 9/2005 | Chow et al. |
| 7,103,613 B2 | | 9/2006 | Nouri |

(Continued)

OTHER PUBLICATIONS

Chun-Nan Hsu et al, "Semantic Query Optimization for Query Plans of Heterogeneous Multidatabase Systems", IEEE, Transactions on knowledge and data engineering, vol. 12, No. 6, 2000, pp. 959-978.*

(Continued)

*Primary Examiner* — Hung Le
(74) *Attorney, Agent, or Firm* — David W. Victor; Konrad Raynes & Victor LLP (57) ABSTRACT

Provided are a method, system, and article of manufacture for using different groups of query graph transform modules to generate execution plans for queries for different database types. A plurality of first type query translator modules include information indicating a first data store type to which the first query translator modules apply and a plurality of second query translator modules include information indicating a second data store type to which the first query translator modules apply. A query is received to query a target data store. A determination is made as to whether the target data store is of the first data store type or the second data store type. The first query translator modules are used to translate the received query to a query execution plan in response to determining that the target data store is of the first data store type. The second query translator modules are used to translate the received query to a query execution plan in response to determining that the target data store is of the second data store type.

13 Claims, 4 Drawing Sheets

U.S. PATENT DOCUMENTS

| | | | |
|---|---|---|---|
| 7,529,728 B2 * | 5/2009 | Weissman et al. | 1/1 |
| 7,606,805 B2 * | 10/2009 | Harris | 1/1 |
| 7,814,114 B2 * | 10/2010 | Mi et al. | 707/760 |
| 2002/0059204 A1 * | 5/2002 | Harris | 707/3 |
| 2003/0177116 A1 | 9/2003 | Ogawa | |
| 2005/0262041 A1 | 11/2005 | Beust et al. | |
| 2007/0038995 A1 | 2/2007 | Boyle et al. | |
| 2008/0147628 A1 * | 6/2008 | Dettinger et al. | 707/4 |

OTHER PUBLICATIONS

Hongjun Lu et al, "On Global Multidatabase Query Optimization", Sigmod Record, vol. 21, No. 4, 1992, pp. 6-11.*

* cited by examiner

USING DIFFERENT GROUPS OF QUERY GRAPH TRANSFORM MODULES TO GENERATE EXECUTION PLANS FOR QUERIES FOR DIFFERENT DATABASE TYPES

BACKGROUND OF THE INVENTION

1. Field of the Invention

The present invention relates to a method, system, and article of manufacture for using different groups of query graph transform modules to generate execution plans for queries for different database types.

2. Description of the Related Art

Database queries may be provided for different types of database, such as the querying of objects in an object oriented database or the querying of rows in a relational database table. A query of a relational database may be expressed in the Structured Query Language (SQL) and a query of an object in an object oriented database may be expressed in an object oriented query language such as the Enterprise JavaBeans Query Language™ ("EJB QL"). (Enterprise JavaBeans Query Language is a trademark of Sun Microsystems, Inc. in the United States and other countries).

Further, a common abstract query language may be used to query different data systems. The abstract query language is not dependent on the specific data system and a user can write a query in this abstract query language without knowing the specific backend data system that will be used to execute the query (relational, object, etc) and the specific query language of the backend system. In addition, queries and programs written in the abstract query language may be ported from one data system to another. EJB QL is an example of such an abstract query language. The query written in EJB QL has to be changed into a query that can be executed by the specific data system. In the case of a relational database the EJB QL query must be translated to SQL. In the case of an object oriented database, the EJB QL query may be executed by iterating through collections of data objects and performing the query operations.

To execute a query, a query optimizer may parse the query and generate an optimized execution or access plan specifying the operations to perform to implement the received query with respect to the objects in memory for an object oriented database or relational database tables. Different query optimizers are used depending on the type of the target database subject to the query.

There is a need in the art for improved techniques for generating execution plans for queries in a heterogeneous data store environment.

SUMMARY

Provided are a method, system, and article of manufacture for using different groups of query graph transform modules to generate execution plans for queries for different database types. A plurality of first type query translator modules include information indicating a first data store type to which the first query translator modules apply and a plurality of second query translator modules include information indicating a second data store type to which the first query translator modules apply. A query is received to query a target data store. A determination is made as to whether the target data store is of the first data store type or the second data store type. The first query translator modules are used to translate the received query to a query execution plan in response to determining that the target data store is of the first data store type. The second query translator modules are used to translate the received query to a query execution plan in response to determining that the target data store is of the second data store type.

DETAILED DESCRIPTION

Figure 1:
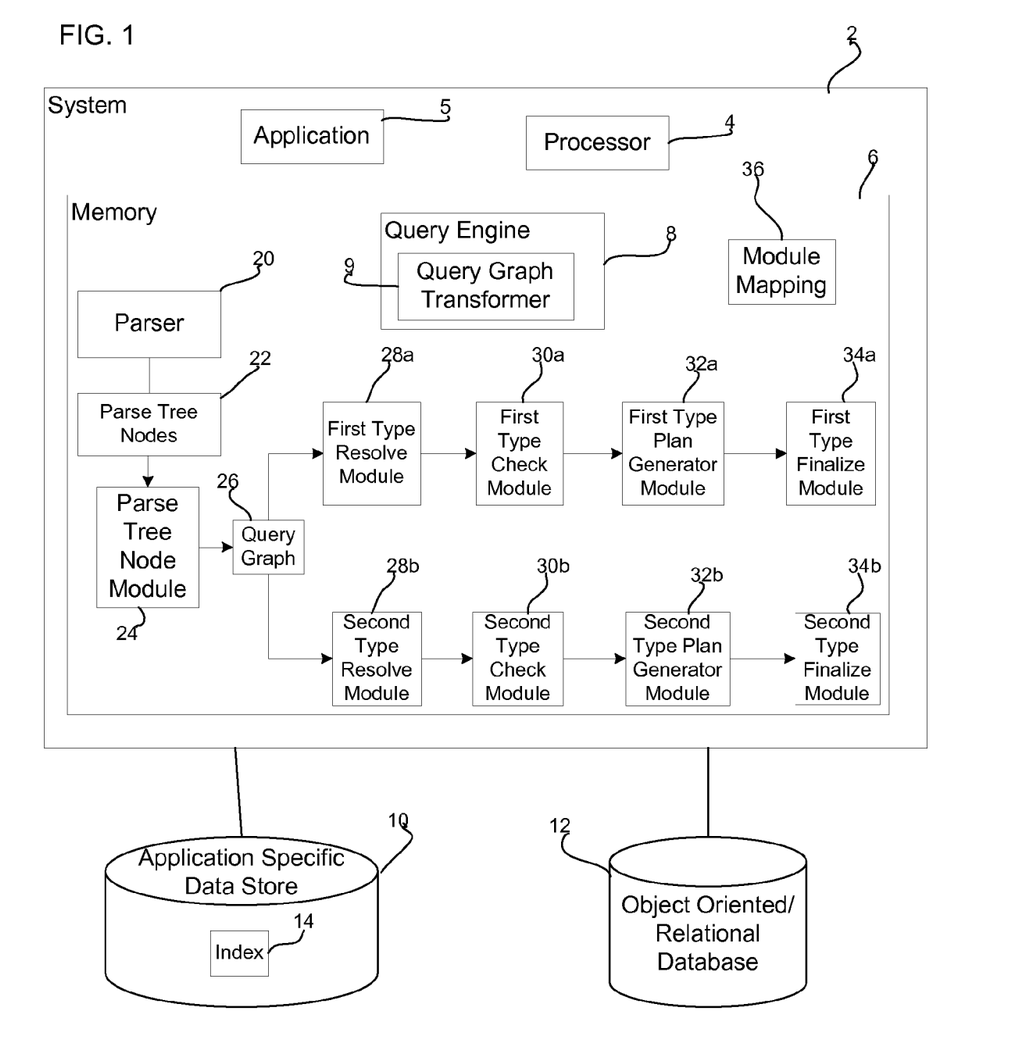
FIG. 1 illustrates an embodiment of a computing environment.

FIG. 1 illustrates an embodiment of a computing environment including a computer system 2 having a processor 4 and a memory 6 including program components executed by the processor 4. The memory 6 includes a query engine 8 that is used to process a query received from an application and fetch data based on the query request. The query engine 8 includes a query graph transformer 9 that is used to manage the transformation a query graph for a query received from an application 5 to one of the data stores 10 and 12. The application 5 may run on the system 2 in which the query engine 8 runs or a separate system. The application specific data store 10 may comprise an array or collection of data or may comprise collections of data with indexed access.

Data store 10 may comprise a data store that is not accessed using a query language, but is accessed using an application 5. Thus, the data store 10 may comprise an application specific database that is accessed using application specific Application Programming Interfaces (APIs) generated from an application 5. The data store 10 may comprise an in-memory object or data store in a system memory, not on a disk. The data store 12 may comprise a database that may be accessed using a query language that is different from the query language of a user application, such as an object oriented or relational database. In this way, the data store 10 is accessed using a different process than the data store 12, which is accessed using a query language. The data stores 10 and 12 may comprise back end data stores for the application 5.

In the event that the data store 12 comprises a relational database, then the data store 12 may include database tables. In the event the data store 12 comprises an object oriented database, then the data store 12 may include objects having attributes and properties and an index 14 associating key words and identifying objects whose properties satisfy the key words.

The query graph transformer 9 may invoke a group of modules to generate an execution plan for the received query. The received query may comprise a query in a query language, such as an object query language (e.g., EJB QL), and include an attribute to search, a predicate which may comprise a comparison operator (e.g., equals, not equals, greater than, less than, etc.), and a value for the attribute. The queried attribute may comprise a column or field in a relational database table or a property or relationship of objects for an object oriented database. A parser 20 initially translates the query to parse tree nodes 22 comprising an algebraic representation of the query. A parse tree node module 24 further processes the parse tree nodes 22 to replace and group the nodes into query, select, from, where, term and operation, where the term represent objects and object relationships; the operation represents functions, arithmetic, comparison, binary, unary operations. The output of the parse tree node module 24 may comprise a query graph 26 which represents the query as nodes in a graph, where the nodes comprise the query operations.

The query graph 26 may comprise a single graph structure that can represent both object queries and relational queries. The query graph 26 structure may further utilize a notion of operation that has been abstracted in such a way that a single class "OPER" is used to represent query predicates, logical operations (AND, OR, NOT), functions (average, substring, length, etc.), arithmetic and string operations. The terms in the query such as names of properties, parameters and literals may be represented by a single class "TERM".

In a further embodiment, the query graph 26 may include three types of nodes, Queryop, OPER, and TERM. There is one Queryop node to represent the entire query and there is an additional Queryop for each subquery. The Queryop contains references to the major elements of the query, such as the list of select expressions, from expressions, filter expressions, grouping and ordering expressions. The OPER nodes represent arithmetic, string operations, predicates and logical. The TERM nodes represent defined properties, parameters and literal values.

The memory 6 includes two groups of query graph transformation modules, including a group of modules 28a, 30a, 32a, and 34a, for a first type of data store subject to the query, such as an application specific database and a second group of modules 28b, 30b, 32b, 34b, for a second type of data store subject to the query, such as an object oriented or relational database 12. The module implementations for the different types of data stores include database specific operations to implement the query optimization for the type of database, such as object oriented and relational, or different structured relational databases and object oriented databases. Although two groups of query graph transformation modules are shown, there may be additional groups of modules for different data store types or data stores of a same type having a different object or table structure. The query graph transformation modules may be executed and implemented within the query graph transformer 9 of the query engine 8.

Resolve modules 28a, 28b include code for their specific data store type to validate the names of the attributes to the query. The resolve operation checks the query graph 26 against a dictionary (or catalog) of defined names to insure that the query is valid and that undefined names are not used in the query. For instance, the first type resolve module 28a may access a dictionary for the data store 10. The second type of resolve module 28b may access a dictionary or other data structure depending on whether the data store 12 comprises an object oriented or relational database. If the data store 12 comprises an object oriented database, then the resolve module 28b may access an object class schema to determine whether the attribute comprising an object property and/or relationship corresponds to a property and/or relationship defined in the class schema of the object oriented database. For a relational database, the resolve module 28b may access a dictionary of the named columns and tables.

For instance, there may be a ResolveRelational and ResolveObjectStore. The ResolveRelational module translates path expressions into equivalent join operations and a ResolveObjectStore may not translate into joins. The ResolveRelational and ResolveObjectStore may use common code.

Check type modules 30a, 30b traverse the query graph 26 to determine whether the operations in the query graph 26 have valid input arguments. This may be performed by checking that numerical operations are only performed on numerical type data and that string operations are only performed with respect to string data. This may involve checking whether the attribute subject to the query is of a data type consistent with the data type of the query and operator.

The plan generation modules 32a, 32b may process the query graph 26 to generate an execution plan. As part of generating an execution plan, the plan generation module 32a, 32b (or other component) may rewrite the query for optimization. The plan generation module 32a may generate an access plan to access data in the data store 10. The plan generation module 32b may rewrite terms to an object oriented or relational database query language. Further, the plan generation module 32b may generate statements for a specific vendor database because different vendor databases may utilize vendor-specific versions of SQL. For relational databases, different variations of the generation module 32b can be subclasses of a common Relational Generate module with appropriate overrides that deal with the database differences.

The finalize modules 34a, 34b may execute the generated execution plan and return the results.

Figure 2:
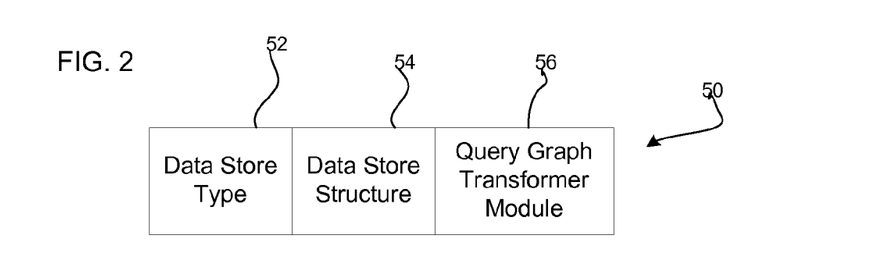
FIG. 2 illustrates an embodiment of a module mapping.

A module mapping 36 provides a mapping for different data store types to a group of modules 28a, 30a, 32a, 34a and 28b, 30b, 32b, 34b. FIG. 2 provides an example of the module mapping 36 entry 50 as including entries comprising a data store type 52, a data store structure 54 of the data, and a translator module 56 (e.g., 28a, 30a, 32a, 34a or 28b, 30b, 32b, 34b) to use for the particular data store type 52 and structure 54.

The query graph transformation transform 9 may take parse tree nodes to form the graph 26 and then perform three transformations on the nodes comprised of 28b, 30b and 32b for translation type processes or alternatively 28a, 30a and 32a for queries that must be executed over data stores. Each transformation may consist of traversing the query graph and processing each node as outlined in FIG. 5.

Figure 3:
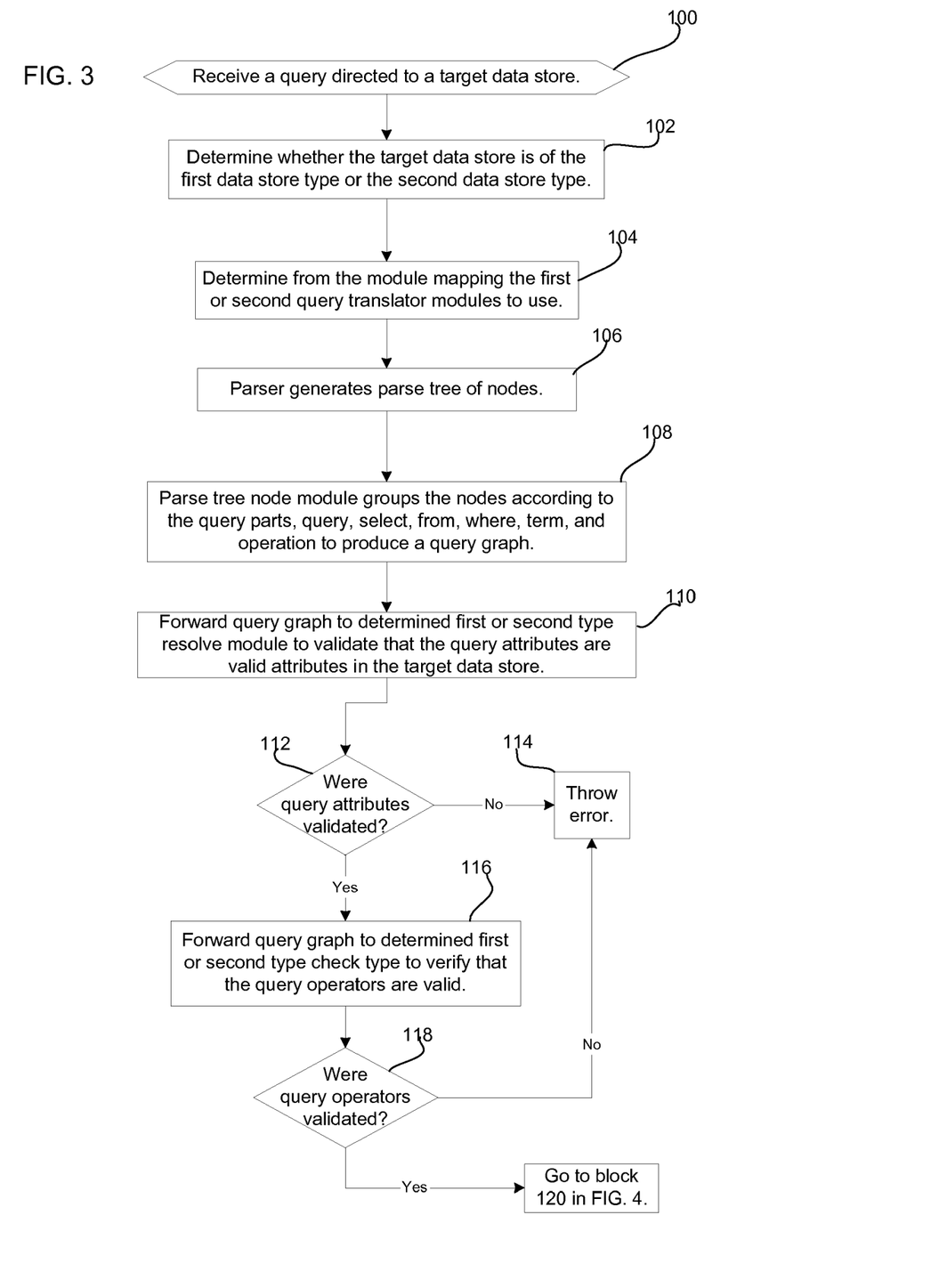
FIGS. 3, 4, and 5 illustrate embodiments of operations to generate an execution plan for a query that may be directed to different types of data stores.
Figure 4:
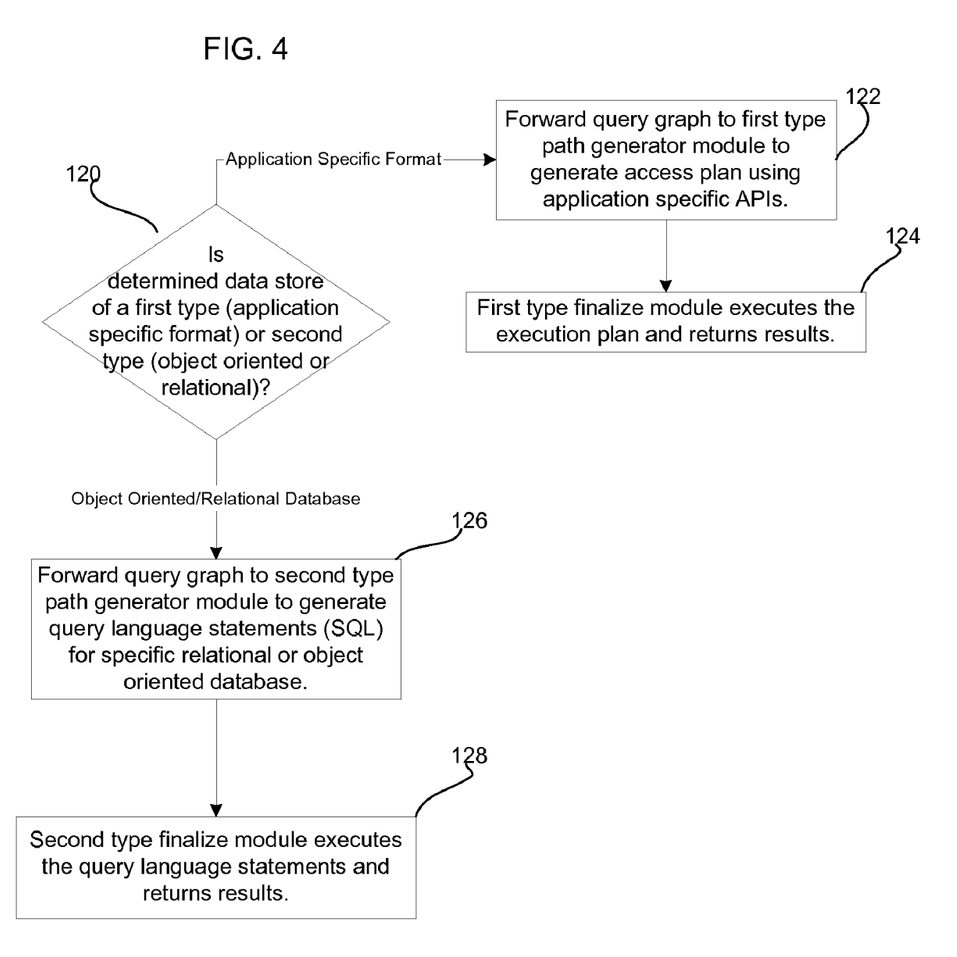

FIGS. 3 and 4 illustrate embodiments of operations performed by the query engine 8 to analyze and determine the group of modules 28a, 30a, 32a, 34a and 28b, 30b, 32b, 34b to use to generate the execution plan for the received query directed to a target data store 10 or 12. In response to receiving (at block 100) the query, the query engine 8 determines (at block 102) whether the target data store 10 or 12 is of the first data store type, e.g., application specific, or the second data store type, e.g., object oriented or relational. The query engine 8 further determines (at block 104) from the module mapping 36 the first 28a, 30a, 32a, 34a or second 38b, 30b, 32b, 34b group of query translator modules to use. The group of modules to use may be determined from the query translator modules 56 indicated in the module mapping 36 by determining the entry 50 having a data store type 52 and queried data store structures 54 matching the determined data store type and structures subject to the received query.

The query engine 8 may invoke the parser 20 to generate (at block 106) a parse tree of nodes 22. A parse tree node module 24 is invoked (at block 108) to group the nodes according to the query parts, such as query, select, from, where, term, and operation to produce a query graph 26. The query engine 8 may then direct the query graph 26 to the determined first 28a, 30a, 32a, 34a or second 38b, 30b, 32b, 34b query translator modules. The query graph 26 is forwarded (at block 110) to the determined first or second type resolve module 28a, 28b to validate that the query attributes correspond to attributes in the target data store 10 or 12, i.e., are the queried attributes or properties valid named components of the queried data store 10 or 12. If (at block 112) the query attributes are not validated, then an error exception may be thrown (at block 114). Otherwise, if (at block 112) the query attributes are validated, then the query graph 26 is forwarded (at block 116) to the determined first or second type check module 30a, 30b to verify that the query operators are valid with respect to the query attributes. If (at block 116) the query operators are not valid, then an error exception may be thrown (at block 114).

If (at block 116) the query operators are validated, then, with respect to FIG. 4, if (at block 120) the determined data store type is a first type of data store, such as an application specific data store 10, then the query graph 26 is forwarded (at block to 122) to the first type path generator module 32*a* to generate an application specific access plan to execute the query against the data store 10. The first type finalize module 34*a* may execute (at block 124) the execution plan and return the results from the application specific data store 10.

If (at block 120) the data store comprises an object oriented or relational database 12, then the second type generator module 32*b* may generate query language statements, such as an SQL query, specific to the type of data store 12. For instance, if the data store 12 comprises an object oriented database, then the second type plan generator module 32*b* or some other component may determine whether the object properties and relationships subject to the received query map to relational database tables. If so, then the plan generator module 32*b* or some other component, such as a rewrite module, may rewrite the query graph 26 to a relational database query, e.g., SQL query, where references between objects may be translated into join operations. The rewritten query graph 26 may be forwarded to the second type path generator module 32*b* to generate an execution plan against tables in the relational database 12. In object oriented queries, the objects may map to columns or tables in the relational database 12 and the object relationships subject to the query may map to primary and foreign keys in the relational database tables. When the objects and relationships in an object oriented query are found in columns or fields in relational database tables, the objects may map to one or more columns of one or more tables, and the queried relationships may map to primary and foreign key or keys in the relational tables. The object oriented query path may be decomposed when the objects or relationships are composed path expressions. A composed path expression is a path expression that has at least one path expression which is a relationship reached by navigating from another relationship. To decompose a composed path expression into a simple path expression to rewrite an object oriented query to a relational database SQL query, all the elements from the composed path expression may be processed. If the element is in a relationship between two objects, then the relationship may be written into an inner join of the base object from which the relationship is navigating from and the target object to which the relationship leads.

Yet further, if the queried object properties specified in the query graph 26 do not map to relational database tables and if there are indexes 14 on the objects provided index keys for the query attributes or properties, then the first type path generator 32*a* generates from the query graph 26 an execution plan using the indexes 14 on the query object properties to determine qualifying objects or objects having property values that satisfy the property values specified in the received query. The objects in the database 10 subject to the query may be stored in the memory 6, where the indexes 14 may provide access to the objects in memory based on object property values. Otherwise, if indexes 14 are not provided for the queried properties, then the first type path generator module 32*a* may generate an execution plan that scans the objects in memory to determine objects having properties/attributes satisfying the query values provided specified for query properties. The second type finalize module 34*a* executes (at block 128) the execution plan and returns results.

Figure 5:
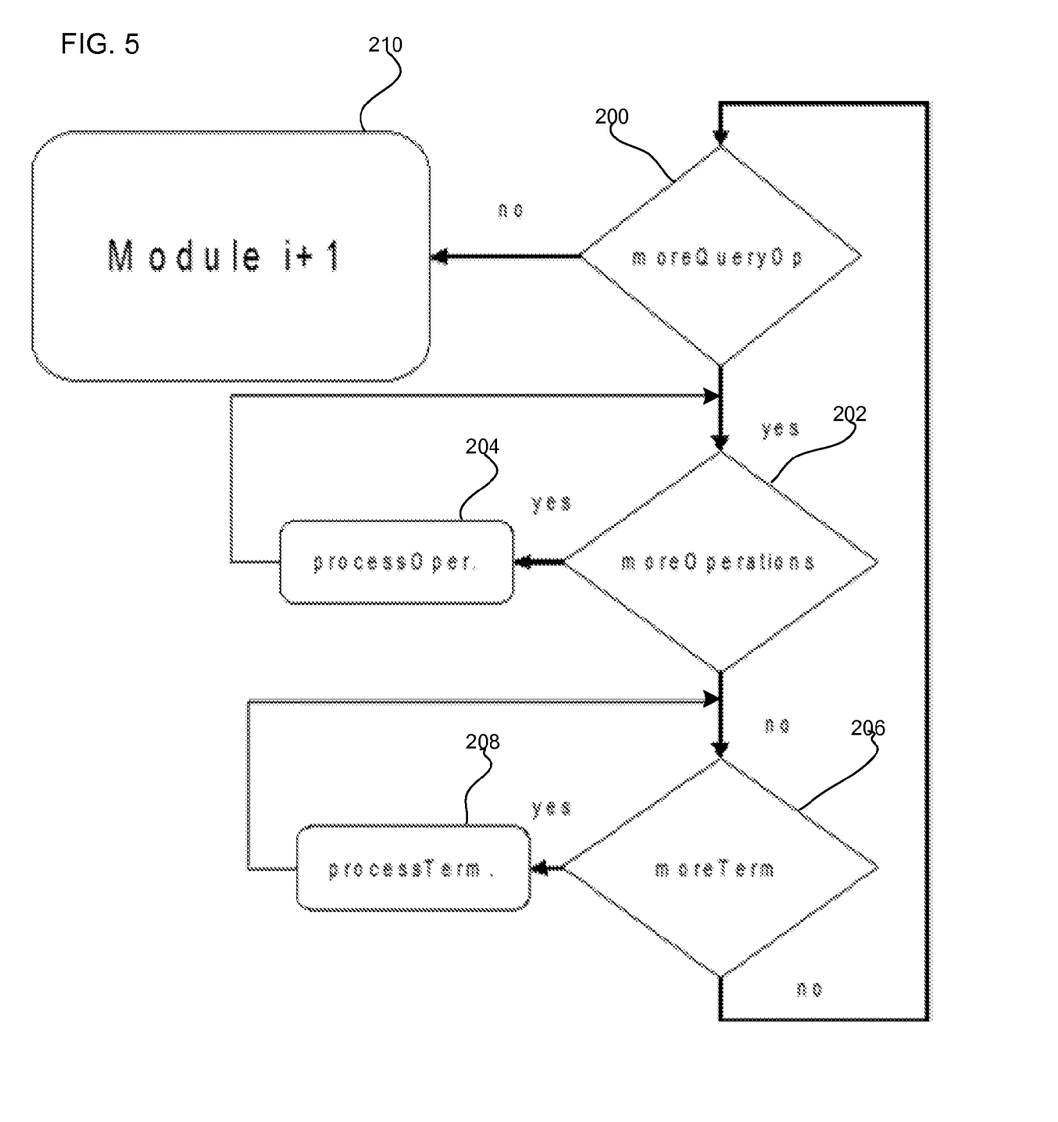

FIG. 5 illustrates an embodiment of operations performed by the generator modules 32*a*, 32*b* to process the query graph 36 components, such as the one query operation node to represent the entire query, additional operation nodes for each subquery, e.g., arithmetic operation, and term nodes comprising properties, parameters and literal values subject to the operation. The query generator module 32*a* 32*b* determine (at block 200) if there is a query operation node to represent one entire query. If so, if (at block 202) there is an additional operation, then the query generator module 32*a*, 32*b* processes (at block 204) each additional subquery operations by generating a query language statement or application program specific statement to implement the operation. If (at block 202) there are no further operations to process, then the generator module 32*a*, 32*b* processes each term, e.g., property, parameters, and literal values, in the query graph to generate (at block 208) them as input to the query operations. If (at block 206) there are no further terms to process, then control proceeds back to block 200 to determine if there are any query nodes in the query graph. If so, control proceeds to block 202 to process all sub-queries or operations in the query and their terms and values. If (at block 200) there are no further query nodes in the query graph 26 to process, then control proceeds to invoke (at block 210) the next module, which after the generation module 32*a*, 32*b* may comprise finalize module 34*a*, 34*b*.

Described embodiments provide different groups of modules used to generate an execution plan for a query that may be directed to different data stores and data store types, such that the group of modules is automatically selected to generate an execution plan based on the target data store type to which the query is directed. Described embodiments provide for execution plan generation in environments where queries may be directed to heterogeneous data stores. The operations to validate and generate the execution plan may be expressed in modules specific to the type of data store to which the query is directed, where the modules implement the general query translation operations for different data store specific implementations.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium having code executed to perform operations, the operations comprising:

providing a module mapping associating a plurality of first type query translator modules with a first data store type to which the first query translator modules apply and associating a plurality of second query translator modules with a second data store type to which the second query translator modules apply, wherein the first and second query translator modules for the first and second data store types include database specific operations to implement query optimization for the first and second data store types to which the first and second query translator modules respectively apply and include first and second resolve modules, respectively;

receiving a query to query a target data store;

determining whether the target data store is of the first data store type or the second data store type;

determining from the module mapping the first query translators to use in response to determining that the target data store is of the first data store type and the second query translator modules to use in response to determining that the target data store is of the second data store type;

generating a parse tree of nodes;

grouping the nodes according to query parts to produce a query graph;

forwarding the query graph to the first or second resolve module from the determined first or second query translator modules to validate that the query attributes are valid attributes in the target data store; and in response to validating the query parts, performing:

using the first query translator modules to translate the received query to a query execution plan in response to determining that the target data store is of the first data store type; and using the second query translator modules to translate the received query to a query execution plan in response to determining that the target data store is of the second data store type.

2. The article of manufacture of claim 1, wherein the first and second resolve modules perform different resolve validation operations specific to their data store type.

3. The article of manufacture of claim 1, wherein the first and second query translator modules include first and second type check modules, wherein the type check modules validate query operations for queried attributes, wherein the first and second type check modules perform different validation operations specific to their data store type.

4. The article of manufacture of claim 1, wherein the first data store comprises an application specific data store and the second data store comprises an object oriented or relational database.

5. The article of manufacture of claim 4, wherein the first query translator generates an access plan to the application specific data store using application specific program statements and wherein the second query translator module generates structured query language statements to implement the received query against the object oriented or relational database data store.

6. A system in communication with at least one data store; comprising:
a memory including:
a plurality of first type query translator modules including information indicating a first data store type to which the first query translator modules apply;
a plurality of second query translator modules including information indicating a second data store type to which the first query translator modules apply, wherein the first and second query translator modules for the first and second data store types include database specific operations to implement query optimization for the first and second data store types to which the first and second query translator modules respectively apply and include first and second resolve modules, respectively; and
a query engine executed to perform operations, the operations comprising:
receiving a query to query a target data store comprising one of the at least one data store;
determining whether the target data store is of the first data store type or the second data store type;
generating a parse tree of nodes;
grouping the nodes according to query parts to produce a query graph;
forwarding the query graph to the first or second resolve module from the determined first or second query translator modules to validate that the query attributes are valid attributes in the target data store; and
in response to validating the query parts, performing:
using the first query translator modules to translate the received query to a query execution plan in response to determining that the target data store is of the first data store type; and
using the second query translator modules to translate the received query to a query execution plan in response to determining that the target data store is of the second data store type.

7. The system of claim 6, wherein the first and second query translator modules include first and second resolve modules, wherein the first and second resolve modules perform different resolve validation operations specific to their data store type.

8. The system of claim 6, wherein the first and second query translator modules include first and second type check modules, wherein the type check modules validate query operations for queried attributes, wherein the first and second type check modules perform different validation operations specific to their data store type.

9. The system of claim 6, wherein the first data store comprises an application specific data store and the second data store comprises an object oriented or relational database.

10. A method, comprising:
providing a plurality of first type query translator modules including information indicating a first data store type to which the first query translator modules apply;
providing a plurality of second query translator modules including information indicating a second data store type to which the first query translator modules apply;
receiving a query to query a target data store, wherein the first and second query translator modules for the first and second data store types include database specific operations to implement query optimization for the first and second data store types to which the first and second query translator modules respectively apply and include first and second resolve modules, respectively;
determining whether the target data store is of the first data store type or the second data store type;
generating a parse tree of nodes;
grouping the nodes according to query parts to produce a query graph;
forwarding the query graph to the first or second resolve module from the determined first or second query translator modules to validate that the query attributes are valid attributes in the target data store; and
in response to validating the query parts, performing:
using the first query translator modules to translate the received query to a query execution plan in response to determining that the target data store is of the first data store type; and
using the second query translator modules to translate the received query to a query execution plan in response to determining that the target data store is of the second data store type.

11. The method of claim 10, wherein the first and second resolve modules perform different resolve validation operations specific to their data store type.

12. The method of claim 10, wherein the first and second query translator modules include first and second type check modules, wherein the type check modules validate query operations for queried attributes, wherein the first and second type check modules perform different validation operations specific to their data store type.

13. The method of claim 10, wherein the first data store comprises an application specific data store and the second data store comprises an object oriented or relational database.

* * * * *